United States Patent [19]

Ranner

[11] Patent Number: 4,844,562
[45] Date of Patent: Jul. 4, 1989

[54] TRACK FOR TRACKED VEHICLE, E.G. A SKI-TRAIL PACKER

[75] Inventor: Dietrich Ranner, Eugendorf, Austria

[73] Assignee: Bombardier-Rotax-Wien Producktions-und Vertriebsgesellschaft m.b.H., Vienna, Austria

[21] Appl. No.: 68,831

[22] Filed: Jun. 30, 1987

[30] Foreign Application Priority Data

Jun. 30, 1986 [AT] Austria ................................. 1765/86

[51] Int. Cl.$^4$ ........................ B62D 55/26; B62D 55/18
[52] U.S. Cl. ................................ 305/56; 305/35 EB; 305/38
[58] Field of Search ................ 305/35 EB, 37, 38, 47, 305/48, 56, 57

[56] References Cited

U.S. PATENT DOCUMENTS

| | | | |
|---|---|---|---|
| 3,575,474 | 4/1971 | Russ | 305/35 EB |
| 3,853,359 | 12/1974 | Pusch | 305/35 EB |
| 3,888,132 | 6/1975 | Russ, Jr. | 305/35 EB |
| 4,560,211 | 12/1985 | van der Lely | 305/35 EB |
| 4,678,244 | 7/1987 | Furata et al. | 305/35 EB |

FOREIGN PATENT DOCUMENTS

| | | |
|---|---|---|
| 1655046 | 7/1971 | Fed. Rep. of Germany . |
| 3112650 | 10/1982 | Fed. Rep. of Germany . |
| 472998 | 7/1967 | Switzerland . |
| 511144 | 9/1971 | Switzerland . |
| 776824 | 6/1957 | United Kingdom . |

*Primary Examiner*—James B. Marbert
*Attorney, Agent, or Firm*—Herbert Dubno

[57] ABSTRACT

A track for a tracked vehicle has a pair of belts bridged by bars along the outer surfaces of the belts while along the inner surfaces thereof, along two mutually juxtaposed edges, the belts are unitarily formed with cleats cooperating with a roller of the vehicle to provide lateral guidance. Preferably the cleats along the two edges of the belts are disposed symmetrically with respect to a longitudinal median plane of the track.

16 Claims, 4 Drawing Sheets

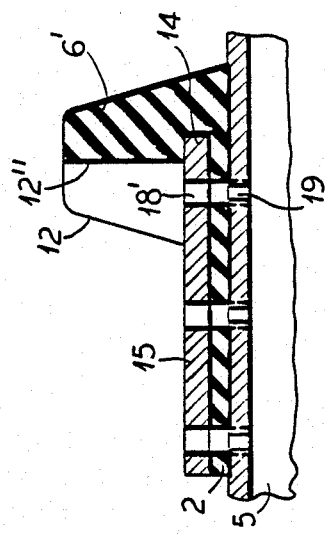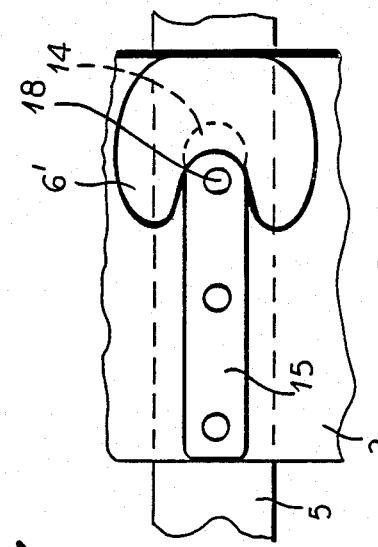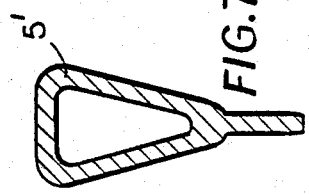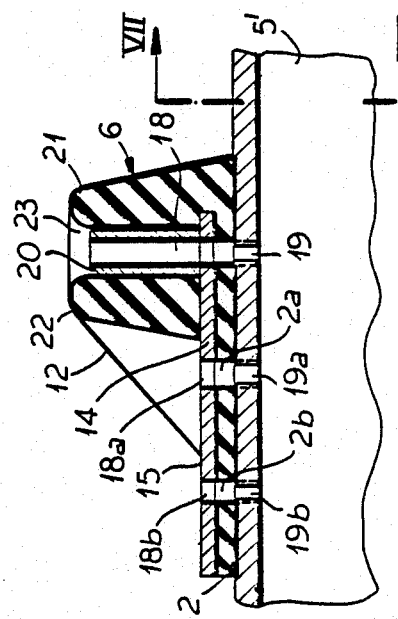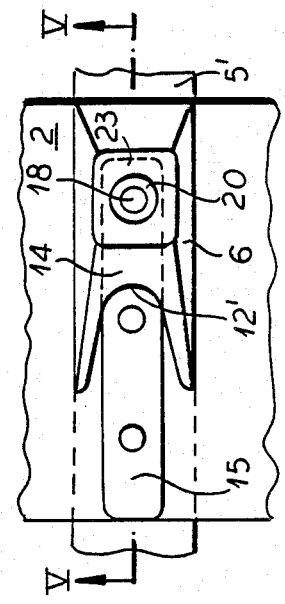

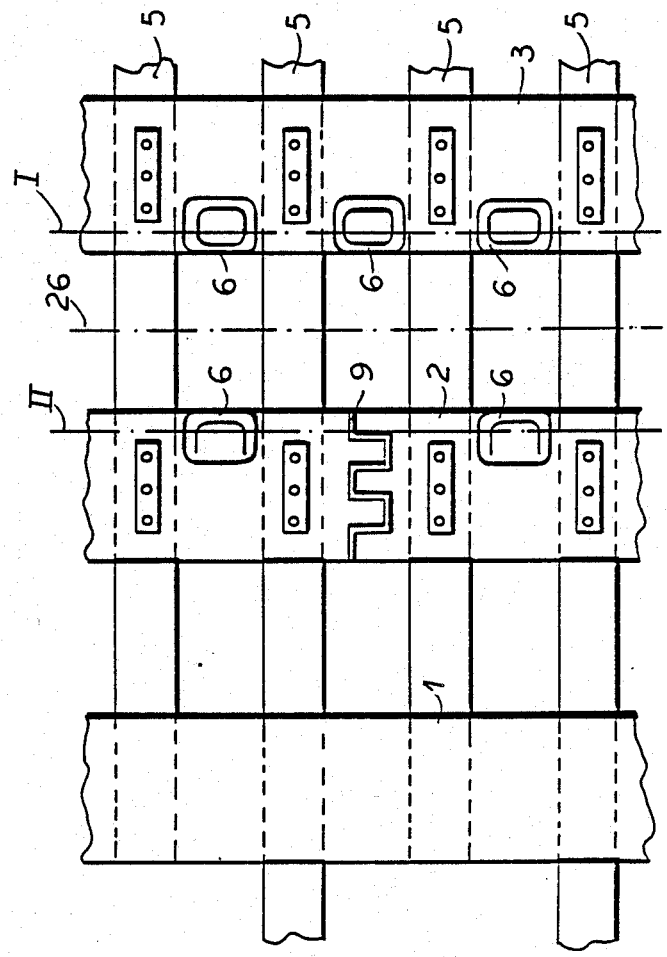

TRACK FOR TRACKED VEHICLE, E.G. A SKI-TRAIL PACKER

CROSS REFERENCE TO RELATED APPLICATIONS

This application relates to my commonly assigned copending applications Ser. No. 06/910,734 (now abandoned) and Ser. No. 06/910,891, both filed Sept. 23, 1986 (now U.S. Pat. No. 4,739,849 of Apr. 26, 1988.

FIELD OF THE INVENTION

My present invention relates to a caterpillar track for a tracked vehicle and, more particularly, to a circulating belt track for trail-making vehicles of the type which can be used in the formation of a packed trail in soft materials or for travel over soft materials, e.g. in the making of a cross country ski trail. Specifically, the invention relates to the type of track in which a plurality of belts, especially rubber belts, are provided with transverse bars engageable with the surface over which the vehicle is to travel and the belts are formed with mutually parallel rows of lateral guide elements, preferably disposed symmetrically with respect to a longitudinal median plane of the track.

BACKGROUND OF THE INVENTION

Belt tracks of the aforedescribed type have been provided heretofore on a variety of tracked vehicles, including snow mobiles, snow-packing equipment and other vehicles adapted to travel over a terrain formed by soft material.

The lateral guide elements have generally been composed, heretofore as metal stirrups, each of the bars spanning the plurality of belts being bolted or otherwise affixed to two stirrups which are adapted to engage opposite flanks of the roller on the vehicle around the periphery of which the track is to be guided.

In operation and especially when the track is subjected to extreme stresses, problems are encountered because both of the guide elements flanking the roller may be subjected to deformation and this can allow a lateral shift of the track and eliminate an outer path for the track around the guide and drive rollers. The metal guide elements, moreover, may be deformed to the point of breakage so that lateral guidance is lost in certain cases.

OBJECTS OF THE INVENTION

It is the principal object of the present invention to provide an improved vehicle track of the aforedescribed general type which eliminates the latter drawback and ensures a longer useful life of the track even under extreme stress conditions.

Another object of this invention is to provide an improved track which has better lateral guidance than has heretofore been the case.

SUMMARY OF THE INVENTION

These objects and others which will become apparent hereinafter are attained, in accordance with the invention in a track for a tracked vehicle which comprises at least two belts bridged by mutually parallel but transversely spaced bars and formed along juxtaposed edges of these belts with lateral guide elements in the form of spaced-apart cleats of elastomeric material formed unitarily with the respective belt.

The cleats on the juxtaposed edges of the two belts bear upon opposite flanks of the roller or rollers of the vehicle on which the endless track is guided and are juxtaposed with one another as well.

With the present invention, the retention of the lateral guide elements on the belt is achieved by making these elements unitary, i.e. in one piece, with the elastomeric belts themselves.

This, in addition, also provides a simplification in the assembly and fabrication of the track, since the cleats need not be separately mounted, no special means need by provided for attaching them to the belts. It has been found to be advantageous in some cases, however, to provide reinforcement for the cleats and to use such reinforcements as part of the means for mounting the bars on the belts of the track.

According to one embodiment of the invention, the cleats are located in regions between the bars of the track and in a region at which the elastomeric belt has its ends joined to an endless configuration, the cleat is omitted. This simplifies mounting the belts on the bars or vice versa because it eliminates any impediment to bolting which the cleats may have provided, and nevertheless allows for joining of the ends of the belt with an appropriate closure so that an endless conformation is achieved.

In a further embodiment of the invention each of the cleats may be aligned with a respective one of the bars and the flank of the cleat turned away from the roller-engaging face can be provided with a reinforcement or support member having a shank extending away from the cleat and bolted to the respective bar. This shank can clamp the belt in a region thereof adjoining the cleat to the bar so that the belt is sandwiched between the shank of the reinforcement member and the bar. In this embodiment, a separation of the belt from the bar is thereby effectively prevented even in the case when lateral guide forces are applied to the cleats.

It has been found to be advantageous in attaching the belts to the bars to vulcanize in place within the cleats respective threaded washers and to secure the bars to the cleats by cap screws traversing the bar and threaded into the respective washers. In this case, of course, to allow access to the cap screw, there must be an opening to at least a side of the bar.

It is also possible to bolt the bar through the full cross section of the cleat to the belt and in that case it has been found to be advantageous to provide the cleat with a metal sleeve which can be vulcanized in place and against which the head of a screw threaded into the bar can be braced. That sleeve can be welded to a shank of the type previously mentioned and the cleat can, in the region at which this shank emerges therefrom, be formed with a recess or indentation to allow the insertion of a cap screw and nut arrangement to effect the clamping action previously mentioned.

In another alternative, the shank may be connected to an angled foot or leg bearing upon the flank of the cleat turned away from the guide roller.

The cleats can be generally of trapezoidal cross section with one flank proximal to the edge of the belt and forming the guide surface and another flank facing away form the edge of the belt which is juxtaposed with the other belt.

The shank can effectively form a leaf spring pressing downwardly upon the belt at the cleat into which it can penetrate or against which it can bear with a resiliency which contributes to the retention of the belt against the bar.

Where the shank penetrates or bears against the cleat, it can be vulcanized to the latter.

In the system of the invention, the support and drive wheels of the vehicle can be disposed between rows of the lateral guide cleats with a small lateral play being left between the wheel and the guide flanks of the cleats so that relative movement is not completely restricted. The periphery of the wheel, however, can engage the bars exposed between the belts.

BRIEF DESCRIPTION OF THE DRAWING

The above and other objects, features and advantages of the present invention will become more readily apparent from the following description, reference being made to the accompanying drawing in which:

FIGS. 3–5 are cross sectional views in planes similar to those of FIG. 1 through cleats illustrating different embodiments of the attachment of the bars to the belts of the track of the invention, FIG. 5 being a cross section taken along the line V—V of FIG. 6;

FIG. 6 is a plan view of the cleat of FIG. 5;

FIG. 7 is a cross sectional view taken along the line VII—VII of FIG. 5

FIGS. 8 and 9 are views similar to FIGS. 5 and 6, respectively, showing another cleat and mounting arrangement in accordance with the invention; and FIG. 10 is a plan view of a portion of a track utilizing the principles of FIGS. 1 and 2 of the invention.

SPECIFIC DESCRIPTION

Figure 1:
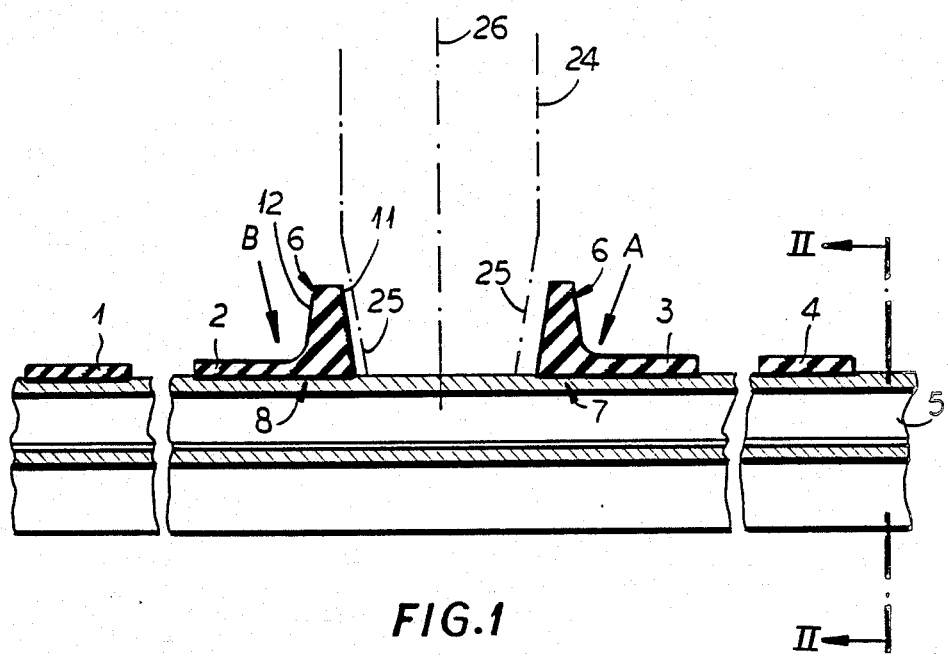
FIG. 1 is a cross sectional view taken in a plane transverse to the direction of travel of the track of the invention, which direction of travel can be considered to be perpendicular to the plane of the paper in FIG. 1, the latter corresponding to a section along the line I—I of FIG. 2.
Figure 2:
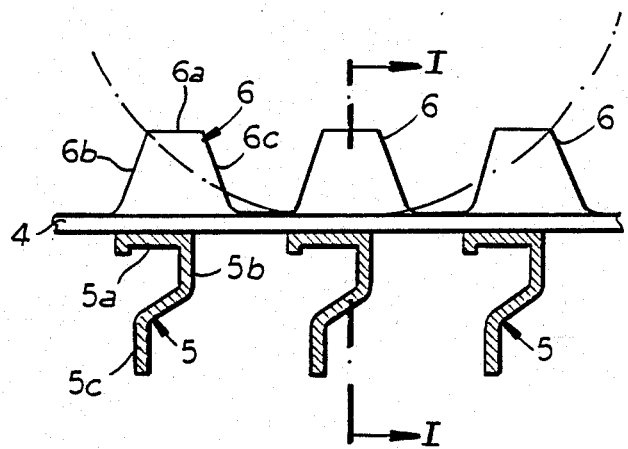
FIG. 2 is a cross sectional view taken along the line II—II of FIG. 1.

FIGS. 1, 2 and 10 show a track for tracked vehicle which is only represented by one of its guide or drive rollers 24 shown in dot-dash form and which may be a track for snow travel, e.g. in a vehicle for packing a ski trail or the like.

The track comprises a multiplicity of mutually parallel transversely spaced bars 5, each of which has a flange 5a, a downwardly projecting leg 5b which is angled and terminates in an end member 5c positioned so as to overhang the flange 5a. The flange 5a serves to secure the bar to a plurality of mutually parallel but transversely spaced endless belts 1, 2, 3, 4 which are composed of elastomeric material.

When reference is made to an "endless belt" herein, it is intended thereby to designate a belt which may be formed without ends or a belt, as in the case illustrated in FIG. 10, in which the ends are securely joined together so that the belt has an endless configuration.

The connector for the ends of the belt has been diagrammatically illustrated at 9 in FIG. 10 and can be any conventional means for joining elastomeric track belts into the endless conformation. The belt may consist of rubber.

In accordance with the invention, two mutually parallel rows A and B of lateral guide elements are provided along the mutually juxtaposed but spaced-apart edges of the two endless belts 2 and 3 symmetrically to offset sides of a longitudinal median plane 26 of the track.

Of course, if two arrays of guide and drive rollers are provided, the lateral guide elements may be provided between juxtaposed edges of the belts 1 and 2 and 3 and 4, respectively.

One row A of the lateral guide elements is constituted by trapezoidal cleats 6 on one of the belts 3, and formed unitarily with this belt along the edge strip 7 thereof.

The second row B of lateral guide elements is provided in the form of cleats 6 along an edge strip 8 of a further row of the belt 2 which is spaced apart from the belt 3.

The edges 7 and 8 of the belts 2 and 3 are juxtaposed with one another, are identical and mirror-symmetrically oriented and are connected to the bars 5.

The cross section of the bars has been shown in FIG. 2 and described previously, the bars being composed of steel, for example.

The cleats 6, as can best be seen from FIG. 10, can be located between the bars 5, in which case by omission of one of the cleats, place is provided for the end closure 9 securing the ends of the belt together. However, the cleats can be provided in registry with the bars 5 as has been indicated in FIG. 2 and in the remaining Figures as well so that the cleats can participate in the mounting of the bars on the belts.

Figure 3:
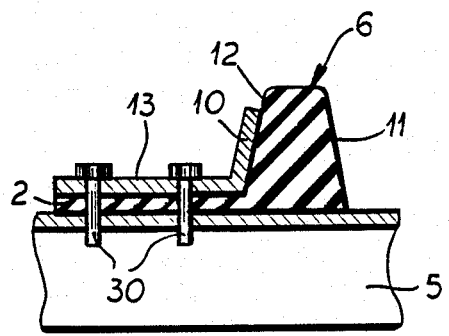

From FIG. 3 it will be apparent that each cleat 6 has a flank 11 which is inclined to the plane 26 and can be juxtaposed with play with a correspondingly inclined flank 25 of the guide or drive roller 24, which bears directly against the bars 5 in the gap between the belts 2 and 3.

The flank 12 on the opposite side of the cleat is likewise inclined to the median plane 26 but so that the flanks 11 and 12 converge toward the axis (not shown) of the roller. In addition, each cleat 6 can have a free end 6a which lies in a plane perpendicular to the median plane 26 and parallel to the roller axis and a pair of convergent flanks 6b and 6c facing respectively in the direction of travel of the track and in the opposite direction.

Turning now to the remaining Figures which show various assemblies of the belt with the bar, in which reference numerals similar to those used above identify similarly functioning parts and center lines have been supplied to represent bolt connections and the holes through which the bolts extend, it can be seen from FIG. 3, that a leg 10 of a reinforcement member can bear against flank 12 and has a shank 13 which is bolted at 30 through the belt 2 to the bar 5. The shank 10 prevents lifting of the cleat 6 from the bar 5 when the flank 11 of the cleat engages one of the guide rollers 24.

Figure 4:
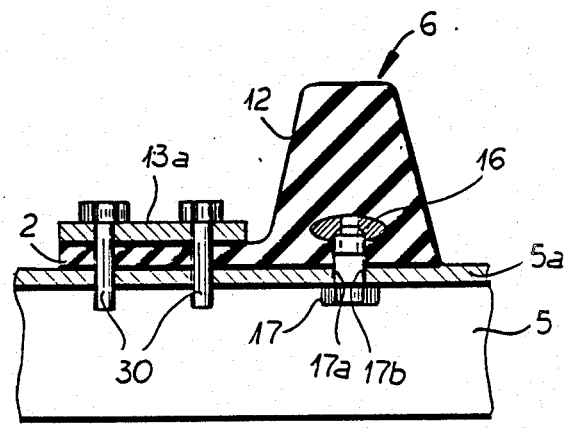

In FIG. 4 another system for attaching the bar 5 to the belt (or vice versa) is disclosed. Here a plate 13a forms the reinforcement member and clamps the belt 2 projecting beyond the flank 12 to the plate 5 by a bolt arrangement represented at 30 in diagrammatic form.

Here, to assist in holding the cleat against the bar 5, a threaded washer or nut 16 is vulcanized into the body of the cleat 6 and is threadedly engaged by a cap screw 17 whose shank 17a passes through a bore 17b in the flange 5a of the bar 5.

Of course to afford access to the head of the screw 17, for tightening or loosening, a side of the bar 5 must be open.

FIGS. 5–9 show embodiments in which the reinforcing or clamping plate 15 in each case, has at least a portion 14 thereof vulcanized into the cleat 6. The section 14 can have spring characteristics selected so that the cleat is pressed resiliently against respective bar 5.

In FIGS. 5-7 a different shape is provided for the bar 5' as can be seen from FIG. 7.

In this embodiment moreover, a bushing 21 lines a bore formed in the cleat and extending through the height of the latter, this bushing serving as the seat for the head of a screw which can be threaded into a threaded bore 19 of the bar 5'. In this case, of course, there is no need for access to the interior of the bar and the closed configuration of the latter shown in FIG. 7 can be used. A flared opening can be provided at 23 at the top of the cleat which can be rounded at 22 to accommodate the head of the bolt and the latter can brace against the upper end of the bushing 21.

The bushing 21 can be welded to the end 14 of the clamping plate 15 which is vulcanized in the cleat 6 and additional holes 18a and 18b can be provided in the plate 15 in alignment with holes 2a and 2b in the belt which register with the holes 19a and 19b of the bar 5' which are threaded to accommodate the cap screw inserted from above. The cleat has its flank 12 recessed as shown at 12' to allow access to the bolt which is to be threaded through the bore 18a.

In the embodiment of FIGS. 8 and 9, a deeper recess 12" is provided in the flank 12 of the cleat 6 and a bore 18' in the plate 15 is used directly to allow a cap screw to engage in the threaded bore 19. In this case, the bushing is omitted. The cleat 6' in the embodiment of FIGS. 8 and 9 has a conical configuration rather than the trapezoidal prismatic configuration of the other Figures.

The flare 23 and the recess 12" seen in FIGS. 5 and 6 respectively, permit a wrench to engage the head of the respective bolt without hindrance from the cleat.

The closed bar 5' of FIGS. 5-7 can be composed by extrusion of a light metal, e.g. aluminum with strength and wear characteristics similar to those of the open bar structure of FIG. 2 which, as noted, is composed of steel. If necessary, access to the interior of the bar 5' may be had from open ends thereof.

In all embodiments, of course, a slight play is provided between the flanks 11 of the cleats 6 to opposite sides of the roller 24 and the flanks 25 thereof to minimize lateral friction between the roller or wheel 24 and the cleat.

I claim:

1. A track for a tracked vehicle having at least one guide roller engageable with the track, said track comprising:
    at least two spaced apart and separate endless belts having spacedly juxtaposed continuous longitudinal edges;
    a multiplicity of mutually parallel spaced apart bars secured to said belts along outer surfaces thereof; and
    respective rows of longitudinally spaced cleats formed unitarily on respective inner surfaces of said belts along said juxtaposed edges and adapted to flank said roller to guide said track laterally on said vehicle, said cleats of said rows being disposed on opposite sides of said roller across a gap separating the cleats of the two belts from one another and having oppositely inclined surfaces engaging opposite flanks of said roller on opposite sides thereof.

2. The track defined in claim 1 wherein said belts are composed of an elastomeric material and said bars are composed of metal.

3. The track defined in claim 2 wherein said cleats are located on the respective belts between the bars and each of said belts has a cleat omitted to accommodate a closure securing ends of the respective belt together to impart an endless configuration to the respective belt.

4. The track defined in claim 2 wherein each of said cleats has a guide flank juxtaposable with said roller and another flank turned away from said guide flank, said track further comprising a respective clamping plate extending substantially from the respective other flank of each cleat on said inner surface of each belt, and bolt means traversing each clamping plate and engaging a respective bar to clamp the respective belts between said clamping plates and said bars.

5. The track defined in claim 4 wherein each plate has a leg angled therefrom and bearing against the respective other flank and retaining the respective cleat against a respective bar.

6. The track defined in claim 4, further comprising an internally threaded body received and vulcanized in each cleat, and a respective screw traversing each bar and threadedly engaging the respective internally threaded body.

7. The track defined in claim 4 wherein each of said clamping plates has at least a portion extending into the respective cleat and vulcanized thereto.

8. The track defined in claim 7 wherein said portion is provided with a bore traversed by a bolt and engaging a respective one of said bars.

9. The track defined in claim 8 wherein said bars are provided with portions having threaded bores respectively engageable by said bolts traversing said bores in said portions.

10. The track defined in claim 8 wherein said cleats are provided with recesses affording access to said bores in said portions.

11. The track defined in claim 10 wherein each cleat is formed with a bore receiving a bushing welded to the respective said portion and adapted to receive a bolt passing through the said bushing.

12. The track defined in claim 11 wherein each bushing and the plate to which it is welded is vulcanized in the respective cleat.

13. The track defined in claim 11 wherein each bushing is recessed inwardly of an end of the bore in the respective cleat, the bores in said cleats being flared outwardly away from the respective bushings.

14. The track defined in claim 1 wherein said cleats of said rows flank said roller with lateral play.

15. The track defined in claim 1, further comprising an internally threaded body received and vulcanized in each cleat, a a respective screw traversing each bar and threadedly engaging the respective internally threaded body.

16. The track defined in claim 1 wherein the rows of cleats are disposed symmetrically with respect to a longitudinal median plane of the track.

* * * * *